(12) United States Patent
Nishijima

(10) Patent No.: US 6,926,107 B2
(45) Date of Patent: Aug. 9, 2005

(54) FRAME ASSEMBLY FOR SNOWMOBILE

(75) Inventor: Shinichi Nishijima, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 204 days.

(21) Appl. No.: 10/013,646

(22) Filed: Dec. 7, 2001

(65) Prior Publication Data

US 2002/0100631 A1 Aug. 1, 2002

(30) Foreign Application Priority Data

Dec. 8, 2000 (JP) ........................................ 2000-374895

(51) Int. Cl.[7] ............................................. B62M 27/02
(52) U.S. Cl. ...................................... 180/190; 180/9.25
(58) Field of Search ................................. 180/182, 190, 180/9.25; 280/781, 782

(56) References Cited

U.S. PATENT DOCUMENTS

| | | | |
|---|---|---|---|
| 3,552,514 A | * | 1/1971 | Alpers ........................ 280/845 |
| 3,709,312 A | | 1/1973 | McGough |
| 3,743,316 A | * | 7/1973 | Stotesbery .................. 280/762 |
| 3,835,948 A | | 9/1974 | Duclo |
| 3,871,460 A | | 3/1975 | Dehnert |
| 3,901,335 A | | 8/1975 | Johnson |
| 3,981,373 A | | 9/1976 | Irvine |
| 4,249,626 A | * | 2/1981 | Fields et al. ............... 180/68.1 |
| 4,350,221 A | | 9/1982 | Ishima |
| 4,620,604 A | | 11/1986 | Talbot |
| 4,887,687 A | | 12/1989 | Asai et al. |
| 4,892,164 A | | 1/1990 | Yasui et al. |
| 4,892,165 A | | 1/1990 | Yasui et al. |
| 5,167,294 A | | 12/1992 | Gessinger |
| 5,232,066 A | | 8/1993 | Schnelker |
| 5,251,718 A | | 10/1993 | Inagawa et al. |
| 5,564,517 A | | 10/1996 | Levasseur |
| 5,586,614 A | | 12/1996 | Kouchi et al. |
| 5,660,245 A | | 8/1997 | Marier et al. |
| 5,944,133 A | | 8/1999 | Eto |
| 5,992,552 A | | 11/1999 | Eto |
| 5,996,717 A | | 12/1999 | Hisadomi |
| 6,115,928 A | | 9/2000 | Dauerer |
| 6,241,265 B1 | * | 6/2001 | Kovar et al. .................. 280/16 |
| 6,446,744 B2 | * | 9/2002 | Wubbolts et al. ........... 180/190 |

FOREIGN PATENT DOCUMENTS

| | | |
|---|---|---|
| JP | 4-306187 | 10/1992 |
| JP | 9-193880 | 7/1997 |

* cited by examiner

Primary Examiner—Anne Marie Boehler
(74) Attorney, Agent, or Firm—Knobbe, Martens, Olson & Bear LLP

(57) ABSTRACT

A snowmobile has a frame assembly. The frame assembly has a front portion and a rear portion. The front portion has a frame member that extends over an engine compartment such that an engine would be disposed generally below the frame member. The frame member is primarily formed with an extruded component that is bent into a U-shape. An air intake box can be supported by the frame member.

19 Claims, 16 Drawing Sheets

FRAME ASSEMBLY FOR SNOWMOBILE

RELATED APPLICATIONS

This application is based upon and claims the priority of Japanese Patent Application No. 2000-374895, filed on Dec. 8, 2000, which is hereby incorporated by reference in its entirety.

BACKGROUND OF THE INVENTION

1. Field of the Invention

The present invention generally relates to a frame construction for a land vehicle. More specifically, the present invention relates to an improved frame assembly for a snowmobile that provides a lowered center of gravity for the snowmobile.

2. Description of the Related Art

Snowmobiles, like most other types of vehicles, are being redesigned to decrease weight while maintaining structural integrity. Along with these design changes, focus is given to vehicle dynamics peculiar to snowmobiles and other off-highway vehicles. For instance, due to the nature of snowmobile use, a lowered center of gravity is desired.

SUMMARY OF THE INVENTION

The frames of the snowmobiles generally are formed of sheet metal and castings. Thus, the frames tend to be somewhat heavy and are a prime area in which weight reduction can be made. Reducing the weight of the frame, however, generally involves removing material from the frame. Removing material typically alters the strength characteristics of certain components of the frame.

With reference now to FIG. 1, a front frame assembly 10 of a prior snowmobile design is illustrated in a side elevation view. This front frame assembly 10 is shown and described in U.S. Pat. No. 5,992,552, issued on Nov. 30, 2001 to Toyochika Eto and assigned to Yamaha Hatsudoki Kabushiki Kaisha. In particular, FIG. 1 is a reproduction of FIG. 5 of the patent with the reference numerals changed.

The front frame assembly 10 was constructed from a sheet metal pressing or stamping. The stamping is generally U-shaped with a lower wall part 12 that extends generally horizontally with a pair of upstanding side walls that are integrally formed with this lower wall part 12. The lower wall part 12 also angles upwardly in select portions of the front frame assembly. One of the side walls 13 has an oval-shaped opening 14 that is aligned with an engine and that accommodates a portion of the engine. The other wall 15 has a slotted opening 16 that extends through its upper peripheral edge. The slotted opening 16 also is sized to facilitate insertion of the engine. The upper end of the slotted opening 16 is closed by a closure plate 18 once the engine is in place. The closure plate 18 generally is removably attached to the wall 15.

This construction provides a strong construction but necessarily increases the weight of the snowmobile. In addition, a large portion of the weight of this construction is disposed in a rather high location, which raises the center of gravity of the snowmobile design. It would be desirable to lower the center of gravity and reduce the overall weight of the snowmobile design; however, simply removing material from the top portion of the construction of FIG. 1 would undesirably weaken the construction. Thus, another construction would be preferred.

With this in mind, one aspect of the present invention involves a frame assembly for a snowmobile. The frame assembly comprises a front frame portion and a rear frame portion with the front frame portion and the rear frame portion being connected. The front frame portion comprises a first side member, a second side member and a floor. An engine compartment generally is defined by the first side member, the second side member and the floor. An engine is disposed within the engine compartment. A frame member extends over the engine and is attached to the frame assembly at a first location forward of at least a portion of the engine and at a second location rearward of at least a portion of the engine. The frame member further defines the engine compartment.

Another aspect of the present invention involves a frame assembly for a snowmobile. The frame assembly comprises a front portion and a rear portion. The front portion defines an engine compartment. A removable frame member extends over the engine compartment. The frame member comprises a first generally longitudinally extending member and a second generally longitudinally extending member. A forward portion of the frame member is connected to the front portion of the frame assembly and a rearward portion of the frame member is connected to the frame assembly.

BRIEF DESCRIPTION OF THE DRAWINGS

These and other features, aspects and advantages of the present invention will be better understood with reference a preferred embodiment, which is illustrated in the accompanying drawings. The illustrated embodiment is merely exemplary and is not intended to define the outer limits of the scope of the present invention. In addition to the above-described prior art figure, the drawings of the illustrated arrangement comprise fifteen figures.

DETAILED DESCRIPTION OF THE PREFERRED EMBODIMENT

Figure 1:
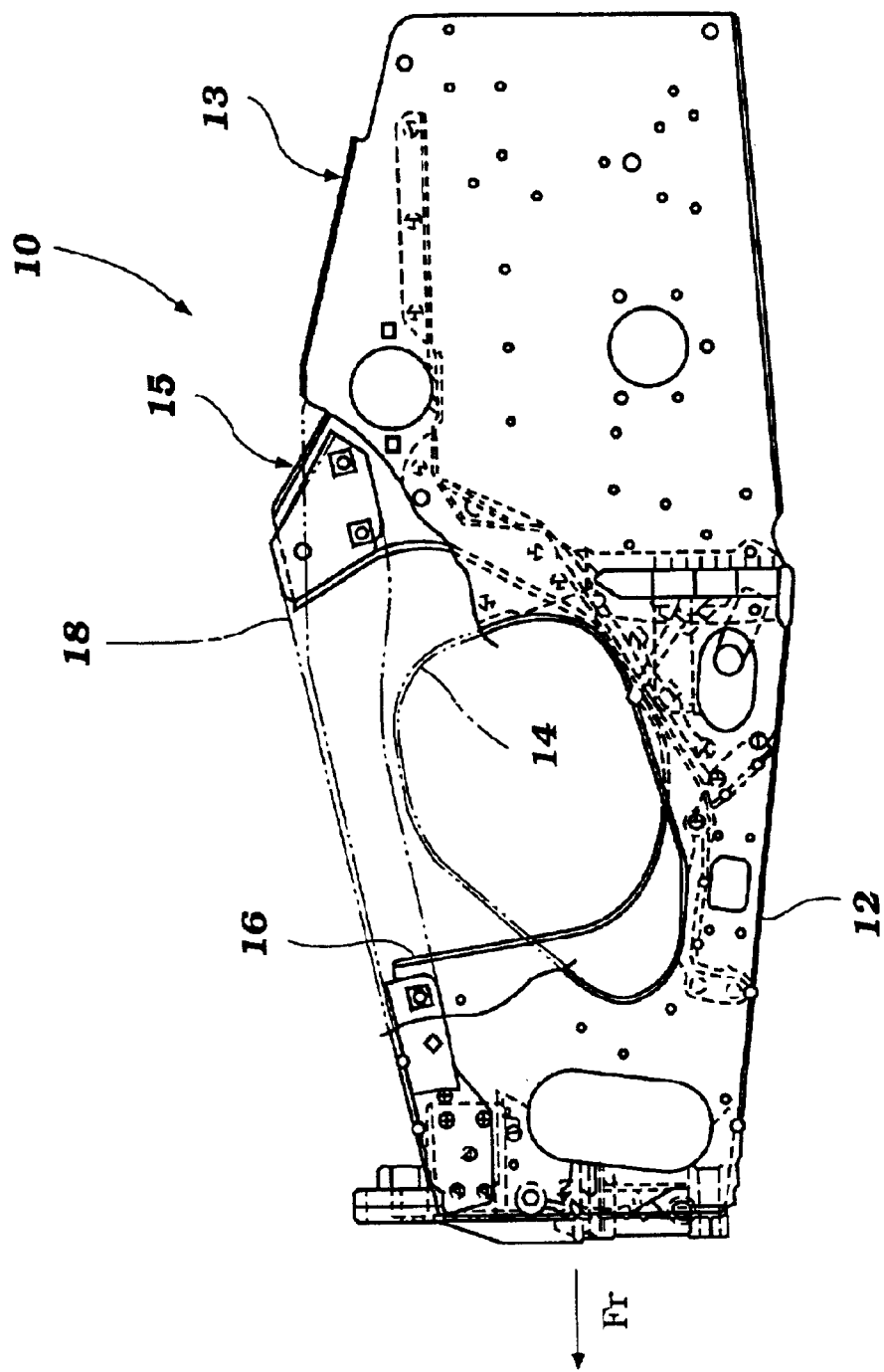
FIG. 1 is side elevation view of a front frame assembly of a prior snowmobile design, which is reproduced from FIG. 5 of U.S. Pat. No. 5,992,552, issued on Nov. 30, 2001 to Toyochika Eto and assigned to Yamaha Hatsudoki Kabushiki Kaisha.
Figure 2:
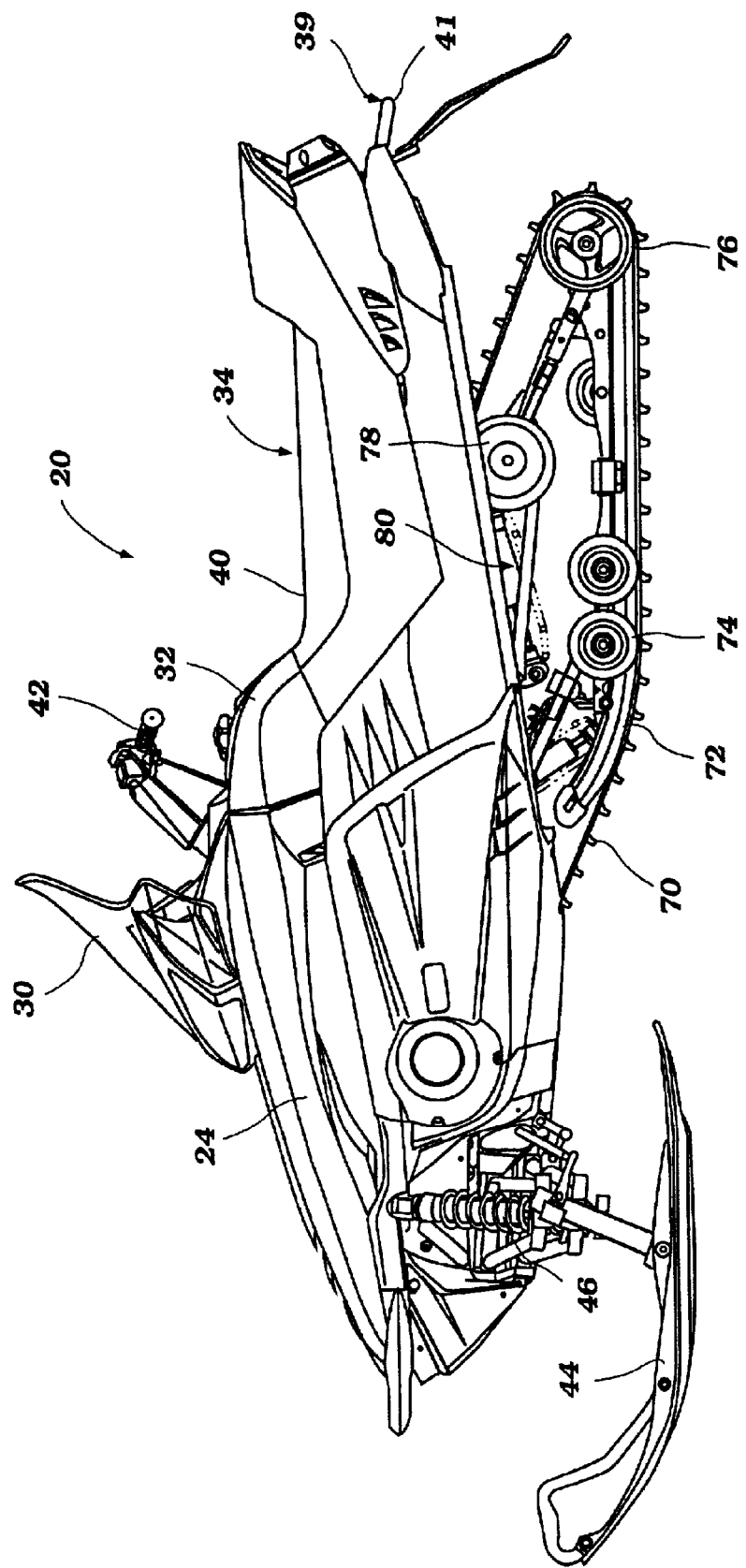
FIG. 2 is a side elevation view of a snowmobile having a frame assembly arranged and configured in accordance with certain features, aspects and advantages of the present invention.
Figure 3:
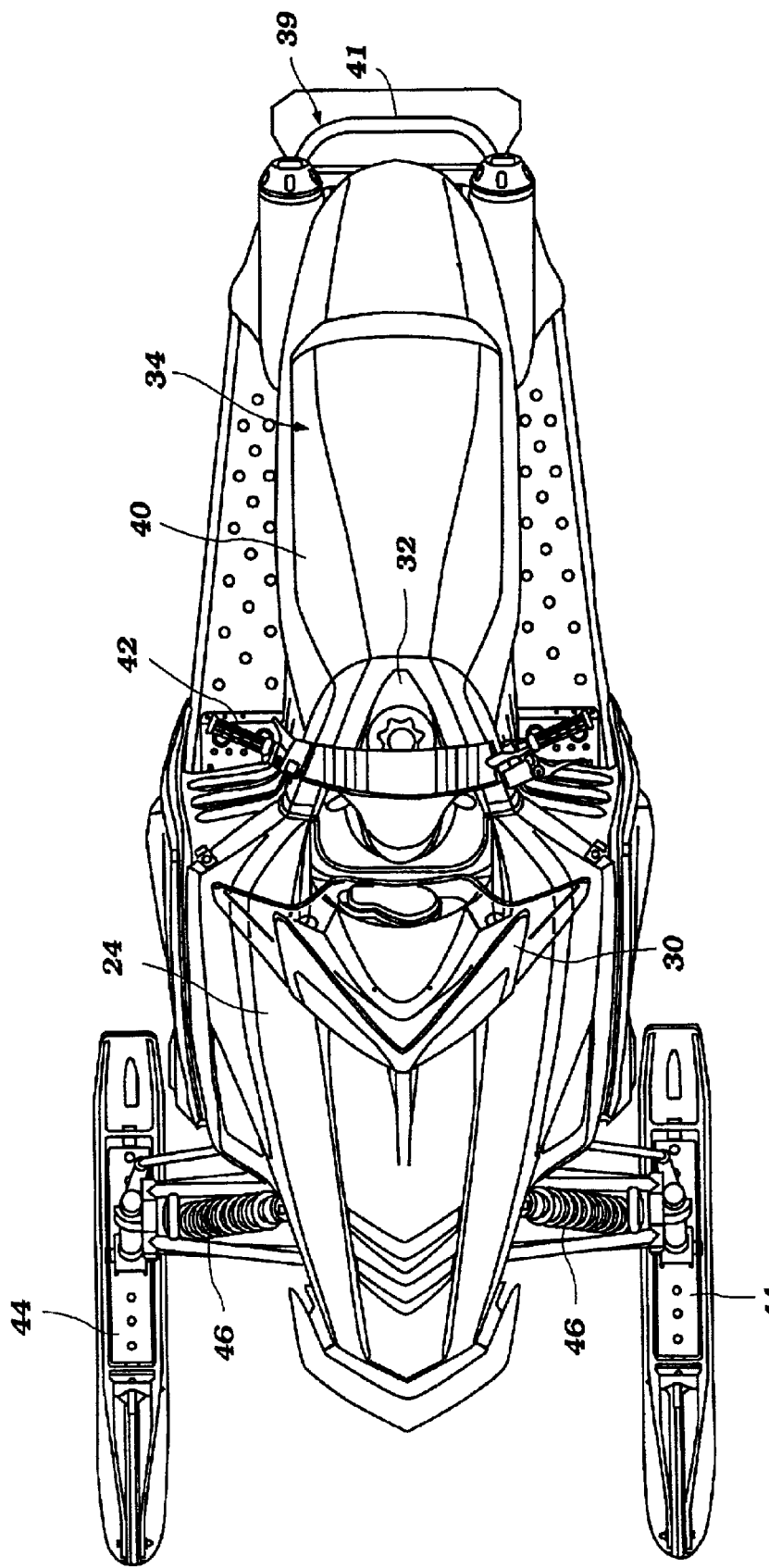
FIG. 3 is a top plan view of the snowmobile of FIG. 2.
Figure 4:
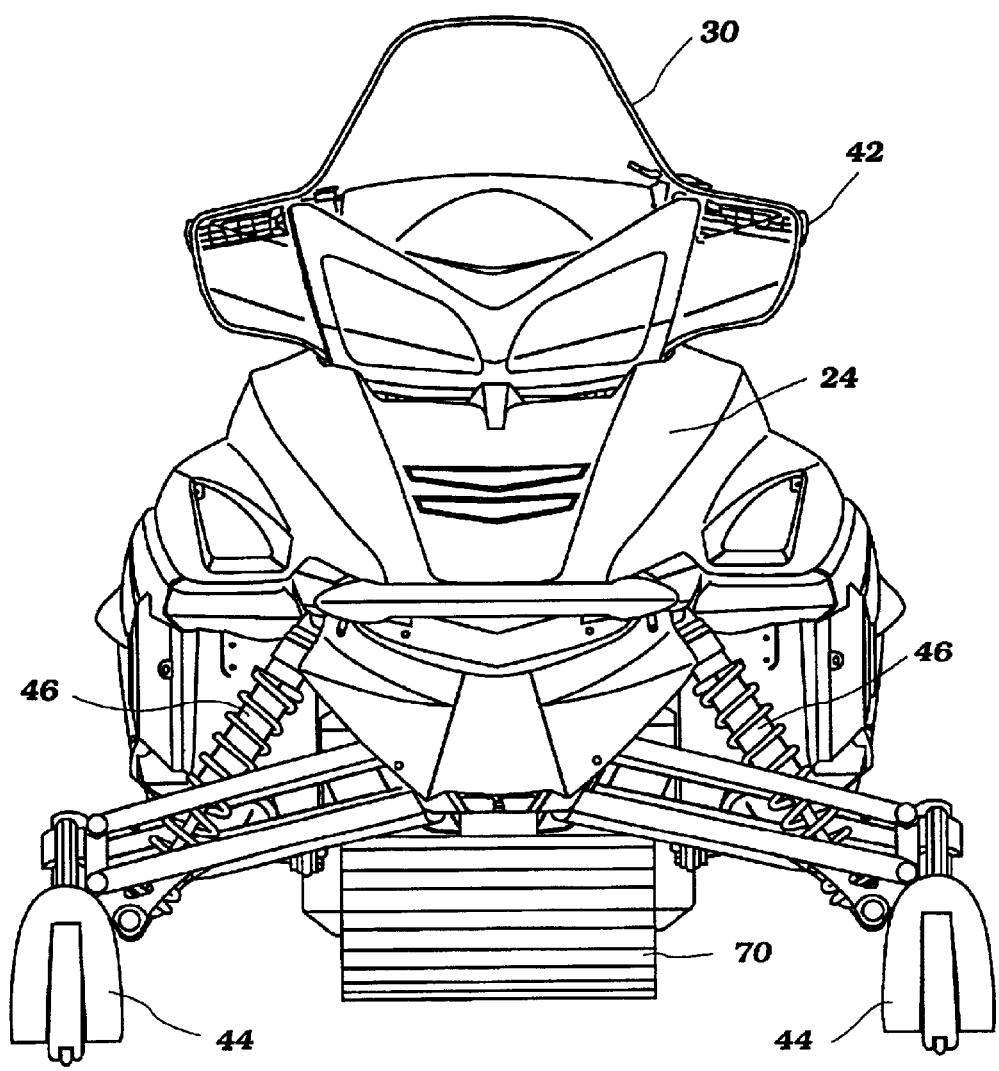
FIG. 4 is a front elevation view of the snowmobile of FIG. 2.

With reference now to FIGS. 2–4, a snowmobile featuring certain features, aspects and advantages of the present invention will be described. The snowmobile, indicated generally by the reference numeral 20, is an environment for which many features, aspects and advantages of the present invention have been specially adapted. Nevertheless, certain features, aspects and advantages of the present invention can be used with other vehicles.

Figure 5:
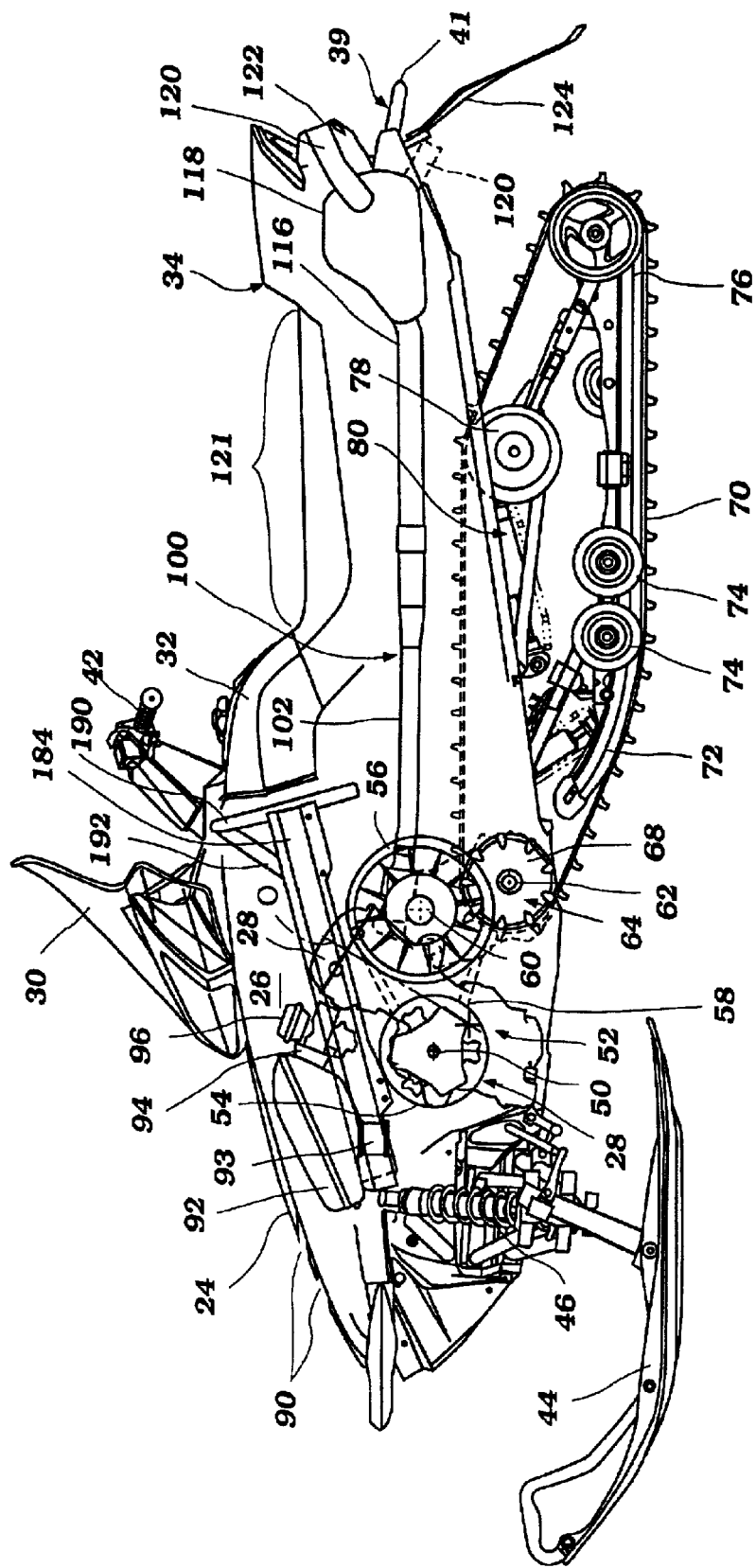
FIG. 5 is another side elevation view of the snow mobile of FIG. 2 with certain portions broken away and other internal portions shown in hidden line to better illustrate certain features, aspects and advantages of the present invention.
Figure 6:
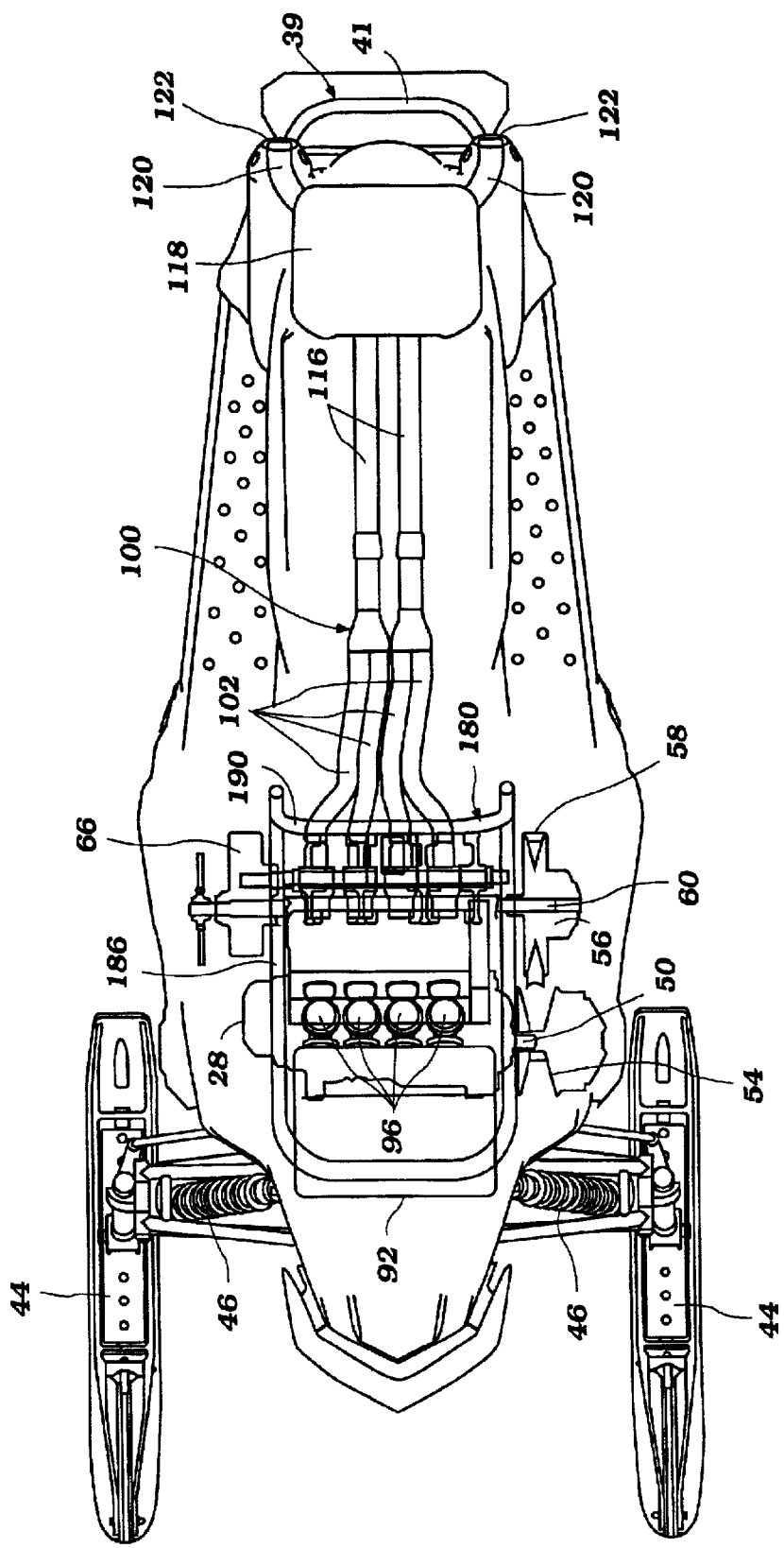
FIG. 6 is another top plan view of the snowmobile of FIG. 2 with certain portions broken away to better illustrate certain features, aspects and advantages of the present invention.

The snowmobile 20 generally comprises a frame assembly 22 (see FIG. 9) that carries a number of other components of the snowmobile 20. The frame assembly 22 will be described in greater detail below. A forward body cover 24 is disposed over a forward portion of the frame assembly 22. As illustrated in FIG. 5, the forward body cover 24 covers, in part, an engine compartment 26 in which an engine 28 is mounted. The engine 28 will be described in greater detail below.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to blend together for aesthetic reasons.

Figure 15:
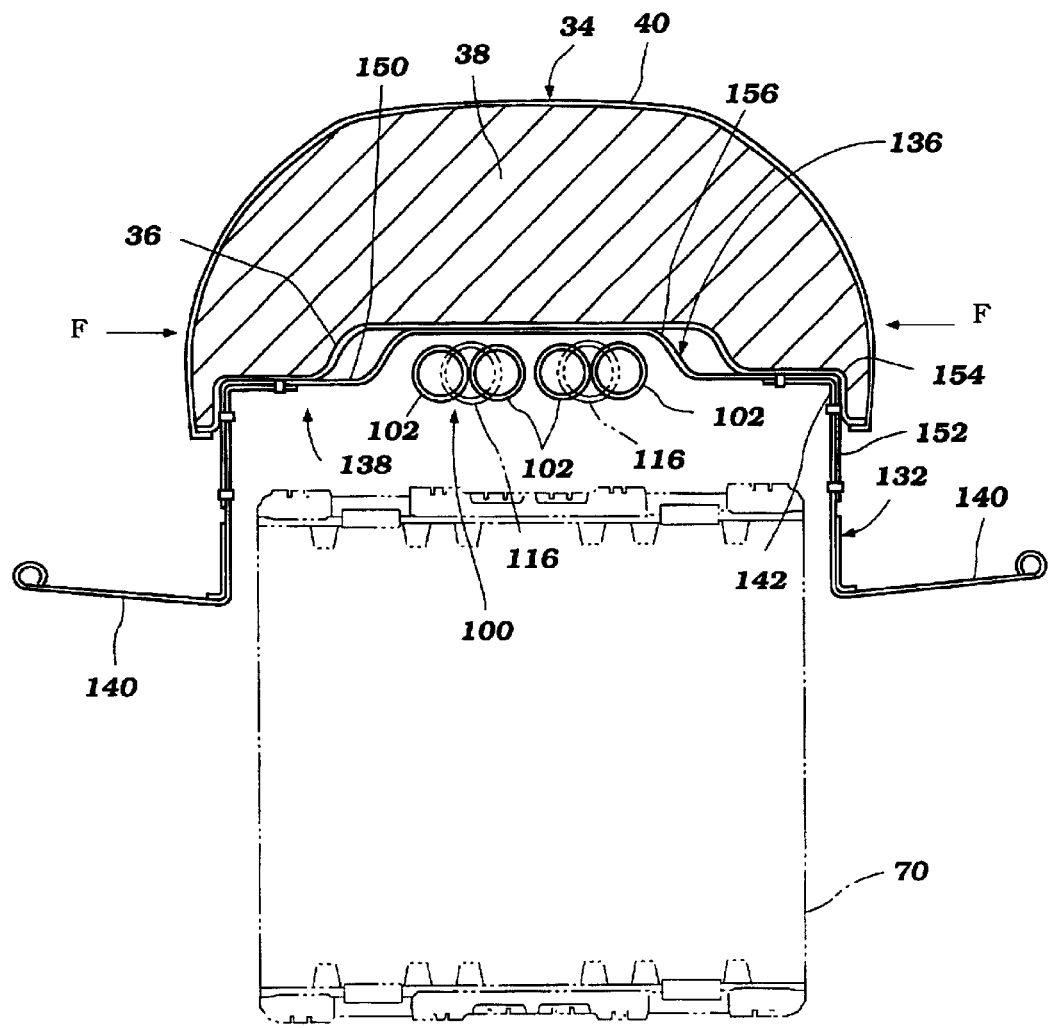
FIG. 15 is a section view of a portion of the snowmobile taken along the line 15—15 in FIG. 3.
Figure 16:
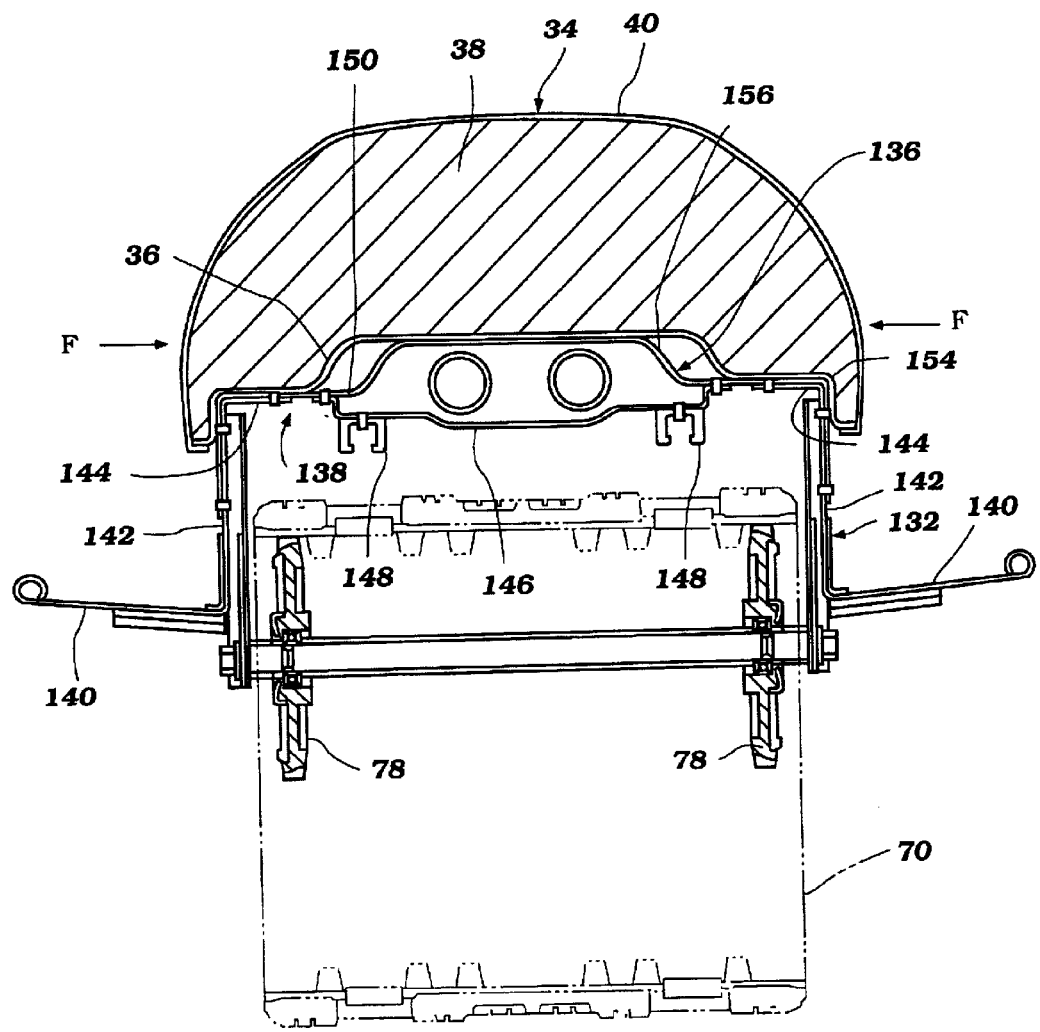
FIG. 16 is a section view of a portion of the snowmobile taken along the line 16—16 in FIG. 3.

Rearward of the fuel tank 32, a seat 34 is mounted to the frame assembly 22. With reference to FIGS. 15 and 16, the seat 34 generally comprises a bottom plate 36 that is sized and configured to attach to the frame assembly 22 in any suitable manner. The bottom plate 36 generally supports the seat 34. A cushion member 38 is mounted to the bottom plate 36. The cushion member 38 can be formed of urethane or any suitable resilient or cushioning material. Overlying the cushion member 38 is a surface skin 40 in the illustrated arrangement. Preferably, the surface skin 40 is formed of a material that is substantially water impermeable. The seat 34 also preferably is designed to allow an operator to squeeze the seat 34 between the knees and is appropriately designed to absorb such forces, which are indicated in FIGS. 15 and 16 with arrows F. Rearward of the seat 34 is positioned a grab bar 39 that comprises a grabbing portion 41 that can be used to raise a rear portion of the snowmobile for turning and maneuvering when the snowmobile is not being ridden.

Forward of the seat 34 and the fuel tank 32 is a steering handle assembly 42. The steering handle assembly 32 can carry appropriate controls and can be suitably coupled to a pair of front skis 44. As the handle assembly 42 is turned, the skis 44 pivot clockwise and counterclockwise about an attachment location. As the skis 44 pivot, the direction of the snowmobile 20 can be altered. The skis 44 are mounted to the frame assembly 22 though a front suspension assembly 46. Any suitable front suspension assembly 46 can be used.

Figure 9:
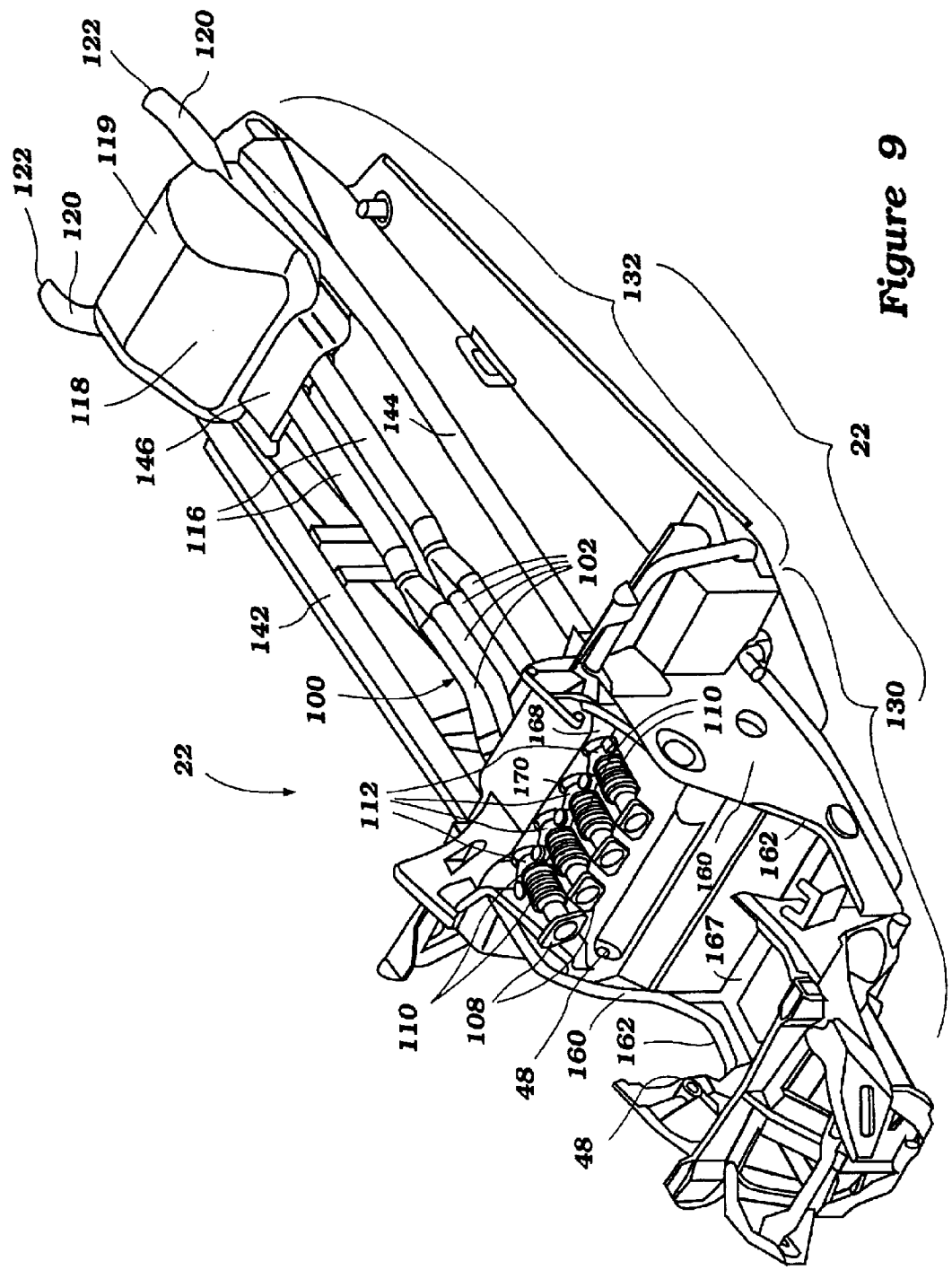
FIG. 9 is a perspective view of a frame assembly and certain components of an exhaust system of the snowmobile of FIG. 2.

With reference now to FIG. 5, the engine 28 is mounted to the frame assembly 22 in any suitable manner. As illustrated in FIG. 9, a set of resilient engine mounts 48 can be used to secure the engine to the frame assembly 22. The engine mounts 48 can be formed of rubber or a similar substance. By mounting the engine 28 with the resilient engine mounts 48, vibrations caused by operation of the engine 28 are reduced or eliminated before transmission through the frame assembly 22 to the operator.

The engine 28 in the illustrated arrangement is an inclined L-4 four-cycle engine that is mounted transversely within the engine compartment 26. In other words, the illustrated engine 28 comprises four cylinders that extend side-by-side across a width of the snowmobile 20. The cylinders each comprise a center axis O that is inclined relative to vertical. In some arrangements, engines having differing numbers of cylinders, different cylinder configurations (e.g., V, opposing, etc.), different orientations (e.g., vertical) and different operating principles (e.g., two-stroke, rotary, etc.) can be used.

The engine 28 also comprises an output shaft 50. The output shaft 50 drives a transmission, which is a continuously variable transmission 52 in the illustrated arrangement. Other transmissions also can be used. In the illustrated arrangement, the output shaft 50 rotates a drive pulley 54. The output shaft 50 and the drive pulley can be connected together through a clutch, a centrifugal clutch, a sprag clutch or can be directly connected together.

The drive pulley 54 powers a driven pulley 56 with a v-belt 58 in the illustrated arrangement. In some configurations, a drive chain can be used in place of the v-belt 58. Other arrangements also can be used. The driven pulley 56 is connected to and rotates about a transfer shaft 60. In the illustrated arrangement, the transfer shaft 60 carries a sprocket (not shown) at the end opposite to the driven pulley 56. The sprocket is connected to a further sprocket that is carried by a drive shaft 62. The sprockets are connected together by a chain in one arrangement and these three components are disposed within a chain box 66.

Figure 7:
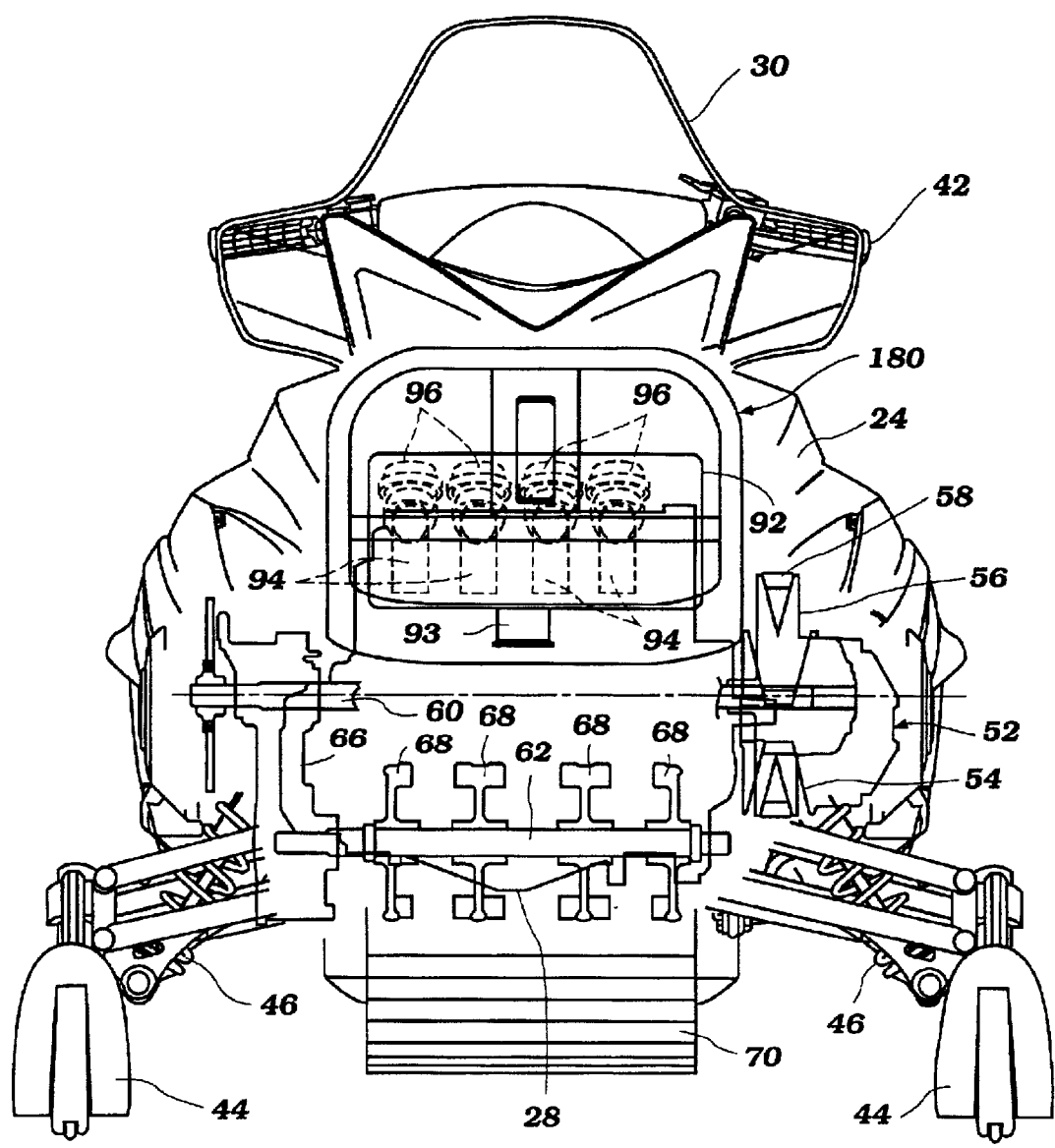
FIG. 7 is another front elevation view of the snowmobile of FIG. 2 with certain portions broken away and other internal portions shown in hidden line to better illustrate certain features, aspects and advantages of the present invention.

The drive shaft 62 powers a drive unit 64. The drive unit 64 generally comprises a plurality of drive wheels 68. With reference to FIG. 7, the illustrated drive unit 64 comprises four drive wheels 68. The drive wheels 68 provide a motive force to a drive belt 70, which is commonly used in the snowmobile industry.

With reference again to FIG. 5, the drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly with a rear suspension system 80. Any suitable rear suspension system 80 can be used and certain portions of the rear suspension system 80 have been schematically illustrated in the illustrated arrangement.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

With reference again to FIG. 5, air is drawn into the engine compartment 26 through suitable air passages. In some arrangements, the air is drawn through ventilation openings 90 formed in the body cover 24. The air drawn or forced into the engine compartment 26 circulates about the engine 28 and related drive components to help cool the engine 28 and the related drive components.

The air also is drawn into an air intake box 92. The air intake box 92 is disposed forward of the engine 28 in the illustrated arrangement. The air intake box 92 can be mounted to the frame assembly 22 in a manner that will be described. An inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28 rather than wrapping around the engine 28 and mating with a rearward-facing surface of the engine 28. The charge formers 96 preferably correspond to each cylinder. In some arrangements, a single charge former can be used upstream of a separation point for runners extending to individual cylinders. In addition, in the illustrated arrangement, the engine 28 is carbureted. In some arrangements, the charge formers 96 can be fuel injectors that are mounted for direct injection, indirect injection or port injection.

The air-fuel charge provided in this manner is combusted within the engine in a suitable manner. The combustion byproducts then are exhausted through a suitable exhaust system 100. In the illustrated arrangement, the exhaust system 100 extends directly rearward from the engine. In this manner, an exhaust runner 102 that extends rearward from the engine can be tuned to the engine for improved engine performance. Additionally, the length of each runner 102 can be lengthened prior to merging together with any other runners such that pulse effects on adjoining cylinders can be reduced.

Figure 14:
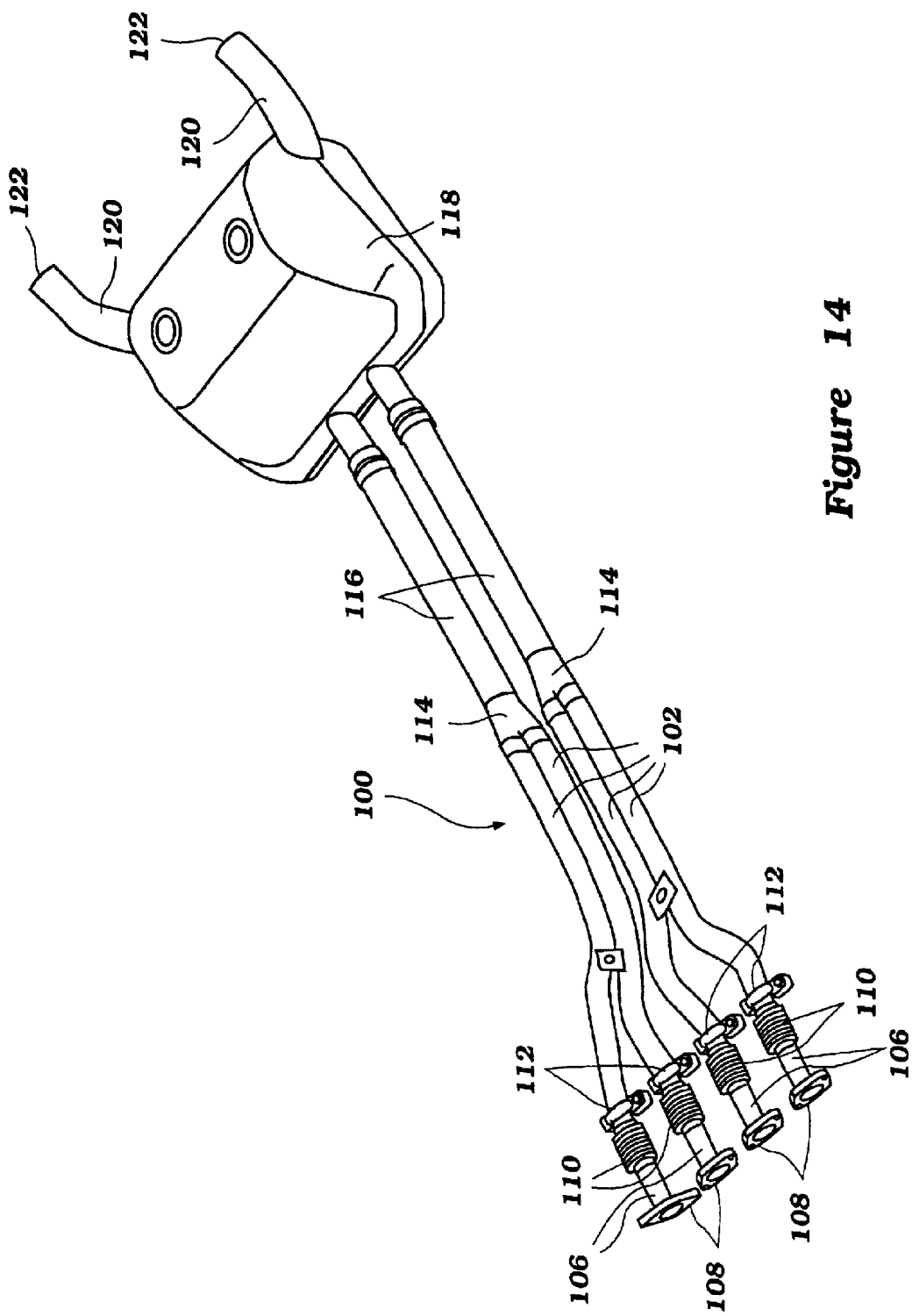
FIG. 14 is a perspective view of the components of the exhaust system that are illustrated together with the frame assembly in FIG. 9.

With reference now to FIG. 14, the exhaust system 100 will be described in greater detail. The exhaust system 100, as described above, preferably comprises the exhaust runners 102 that correspond to each cylinder and that extend generally rearward from the engine. Each exhaust runner 102 is coupled to an exhaust discharge pipe 106 that is individually joined to the engine with a flange 108 in the illustrated arrangement. In some arrangements, a single manifold can be used.

In the illustrated arrangement, each of the discharge pipes 106 are coupled to the corresponding runner 102 with a flexible bellows member 110. The flexible member 110 easily accommodates slight misalignments between the discharge pipes 106 and the runners 102. In addition, the runners 102 are secured in position relative to the frame assembly with a mounting bracket 112 in the illustrated arrangement. Such a mounting arrangement allows the flexible members 110 to isolate a large portion of the engine vibrations away from the exhaust runners 102. In other words, if the portion of the exhaust system 100 upstream of the flexible members 110 were connected with the frame assembly 22 then vibrations from the engine would likely be transmitted directly from the engine 28 to the frame assembly 22.

With continued reference to FIG. 14, at least two of the runners 102 join at a merge location 114 and the merged flow passes through a manifold pipe 116. In the illustrated arrangement, two of the runners 102 join at the merge location 114 and flow into one manifold pipe 116. Thus, the illustrated arrangement features two manifold pipes 116. In some arrangements, more than two runners 102 can join into a single manifold pipe and one or more than two manifold pipes 116 can be used.

The manifold pipes 116 extend rearward to a silencer box 118. The silencer box provides an enlarged volume into which the exhaust can flow. Exhaust energy is dissipated within the silencer box 118 and the noise level of the exhaust can be decreased. In the illustrated arrangement, the silencer box 118 is disposed below a portion of the seat 34 that is rearward of a rider section 121 of the seat. Preferably, at least a portion of the silencer box 118 is covered with cover 119 made of a heat shield material to reduce the transfer of heat out of the silencer box 118 in an upward direction. Thus, positioning the seat 34 above the silencer box 118 does not result in a large amount of heat transfer into the seat 34.

A pair of exhaust pipes 120 extends rearward from the silencer box 118. In some arrangements, a single exhaust pipe 120 can extend from the silencer box 118. Other numbers of exhaust pipes also can be used. One end of the exhaust pipes 120 preferably define to an ultimate exhaust discharge 122 from the snowmobile 20 such that the exhaust gases are discharged into the atmosphere. As illustrated in FIG. 5, the exhaust pipes 120 can extend upwardly and rearwardly from the silencer box 118 while in another arrangement, shown in hidden lines, the exhaust pipes 120 can extend downward to a location forward of a protective flap 124.

Figure 10:
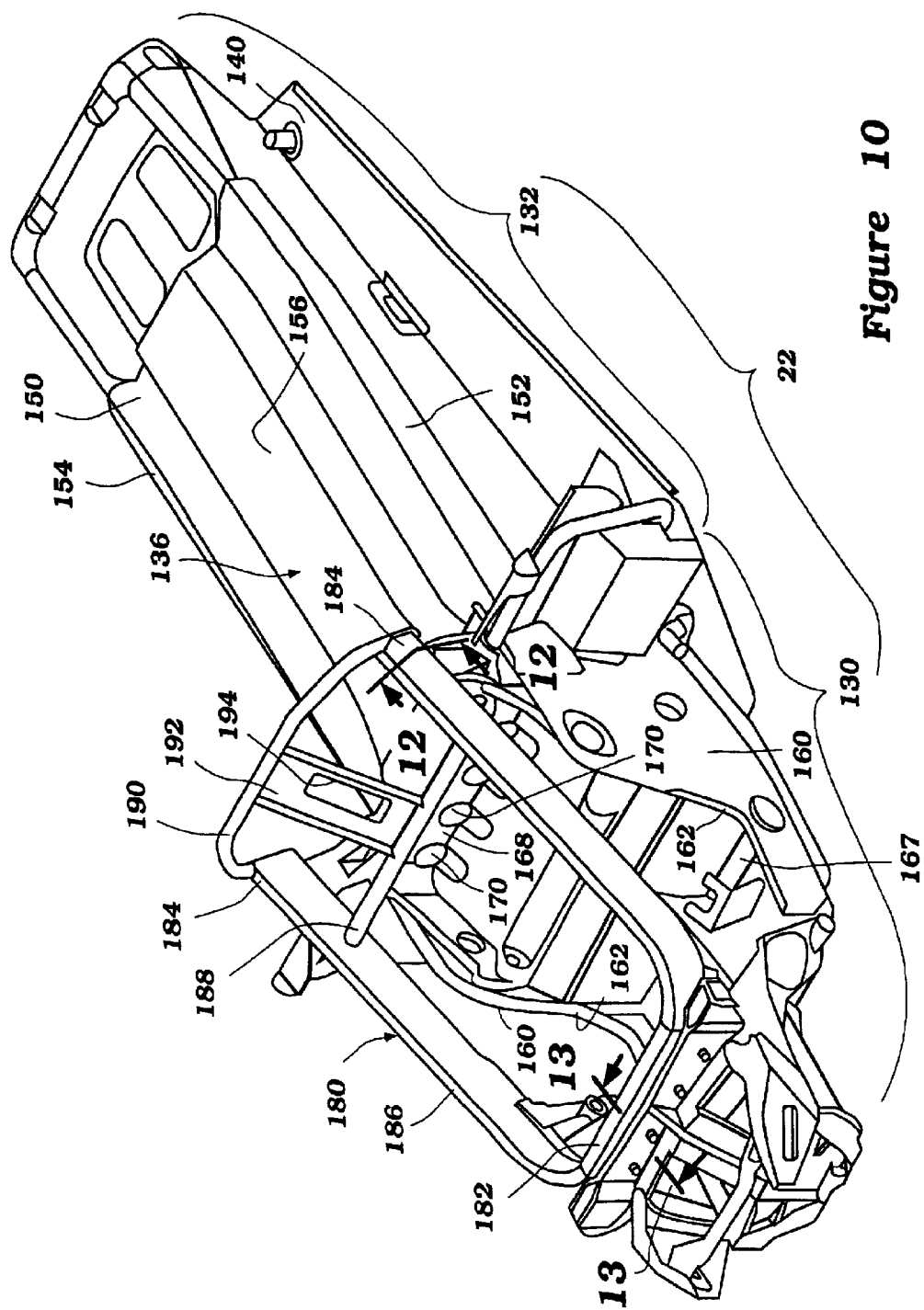
FIG. 10 is a perspective view similar to that of FIG. 9 with the components of the exhaust system removed.
Figure 11:
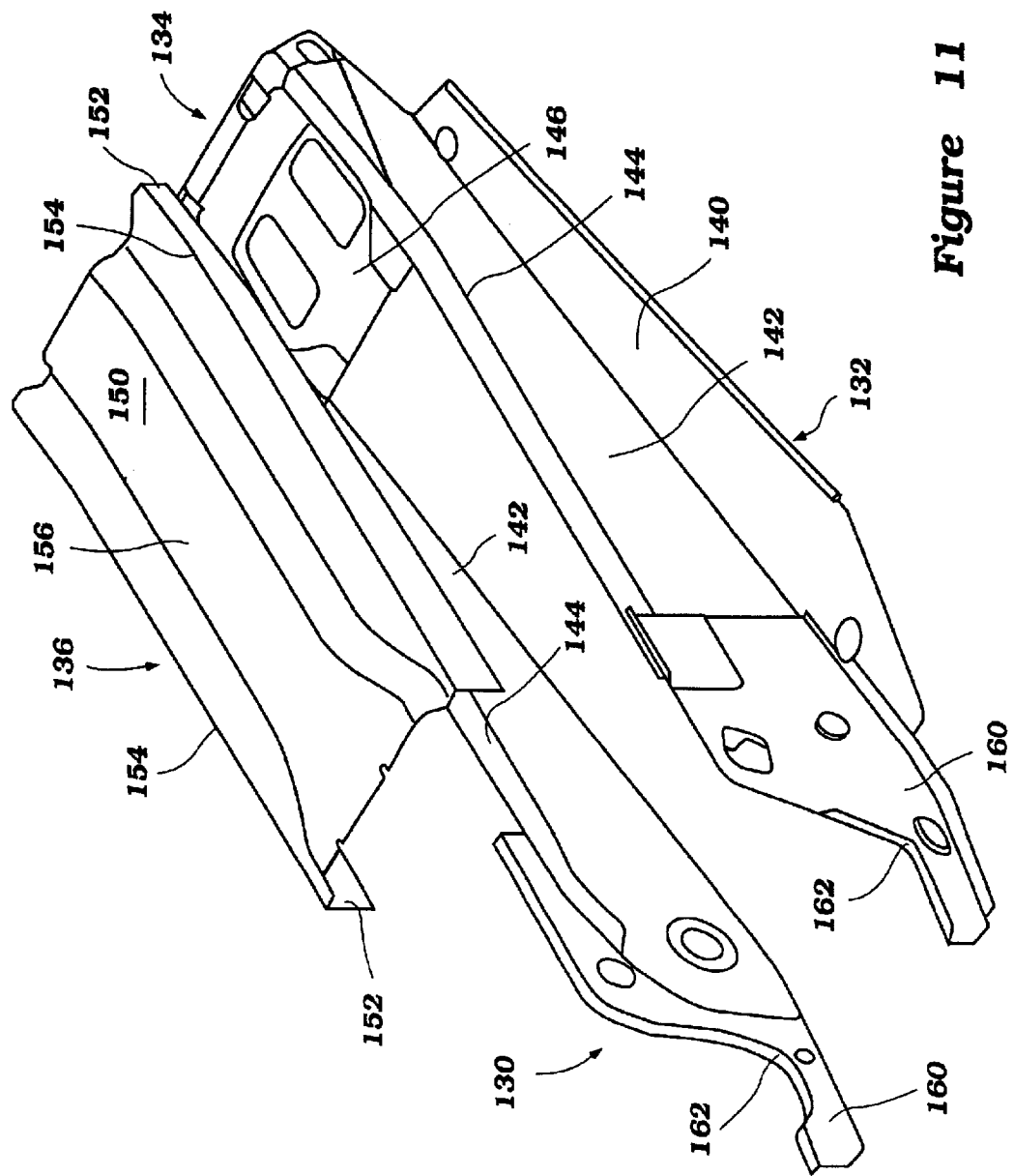
FIG. 11 is a perspective view of a portion of the frame assembly.

With reference now to FIGS. 9–13, the frame assembly 22 of the illustrated snowmobile 20 will be described in greater detail. The frame assembly 22 generally comprises a front portion 130 and a rear portion 132. With reference now to FIG. 11, the rear portion 132 generally is formed by two main components: an inverted generally U-shaped main body 134 and a deck 136.

With reference now to FIGS. 15 and 16, the main body 134 generally comprises an inverted generally U-shaped center portion 138 and a pair of outwardly extending foot steps 140. The foot steps 140 extend along a majority of the length of the snowmobile and are sized and configured to support the feet of an operator and any passengers. As is known, the operator and the passengers sit in a straddle fashion on the seat 34 such that the feet are positioned to either side of the seat 34.

The center portion 138 comprises a pair of upstanding side portions 142 that extend upward from the foot steps 140. The upstanding side portions 142 extend upward to a pair of inwardly extending top surfaces 144. In some arrangements, the top surfaces 144 can extend outward from the side portions 142; however, by extending the top surfaces 144 inward from the side portions 142, the strength of the frame assembly 122 can be increased.

Along a rear portion of the main body 134, a bridge plate 146 extends between the top surfaces 144. The silencer box 118 can be mounted to or proximate the bridge plate 146. Additionally, protective members 148 can be mounted to a lower surface of the bridge plate 146. The protective members 148 form a contact location when the drive belt 70 is overly displaced upwardly toward the frame. Thus, the belt 70 can slide along the protective members 148 without substantially impacting the frame assembly 22.

The deck 136 comprises a horizontal portion 150 and a pair of vertical portions 152 such that the deck 136 is generally U-shaped in configuration. With this configuration, the deck 136 can overlie an upper portion of the main body 134. In one arrangement, the deck 136 is secured to the upper portion of the main body 134 with fasteners such as clips, rivets, bolts, screws and the like. In some arrangements, the two components can be adhered or welded together.

Two edges 154 are defined by the intersection between the vertical portions 152 and the horizontal portions 150. The horizontal portion 150 further comprises an upwardly extending embossment 156 that accommodates a portion of the exhaust system 100. Thus, the exhaust system extends rearward generally below the deck 136 and above the track 70. At a rearward portion of the frame 132, the exhaust system 100 advantageously extends between the bridge plate 146 and the deck 136.

With reference again to FIG. 11, a front side panel 160 is secured to each of the vertical portions 152 of the main body. The panel 160 can be secured in any suitable manner, such as, for example but without limitation, welding, fasteners, adhesives, etc. Each of the side panels 160 comprises a notch 162. The notch accommodates portions of the engine 28 and the related drive unit 64. In some arrangements, the panels 160 can be integrally formed with the main body 134; however, the illustrated arrangement advantageously increases the strength of the frame proximate the engine 28 due to the increased thickness of material.

Figure 8:
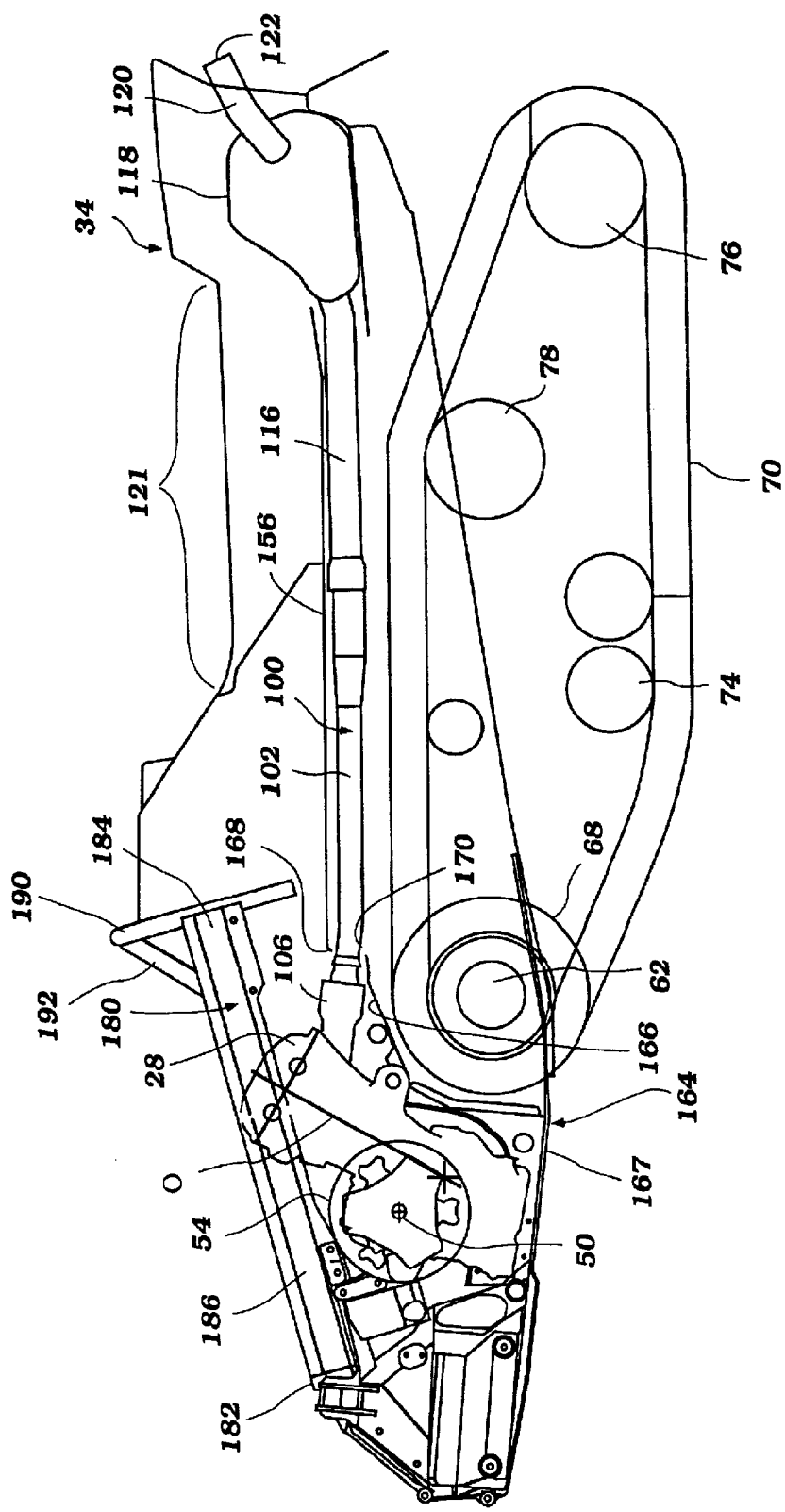
FIG. 8 is a simplified side elevation view of the snowmobile of FIG. 2.

With reference now to FIG. 8, an intermediate member 164 extends between the two panels 160 and between the two vertical portions 152 of the main body. The intermediate member 164 can be attached in any suitable manner. Generally speaking, an upper surface 166 of the intermediate member 164 defines a floor 167 for the engine compartment 26 and extends upward to also define a rear wall 168 of the engine compartment 26. As such a plurality of openings 170 preferably are formed through the rear portion of the intermediate member 164 to allow the exhaust system 100 to extend through the intermediate member 164 and out of the engine compartment 26.

To further increase the rigidity of the frame assembly 22, a frame subassembly 180 is secured to the frame assembly 22. This subassembly 180 desirably is generally rectangular is shape and advantageously is disposed generally above the engine 28. More preferably, the subassembly 180 is tied to the balance of the frame assembly 22 proximate a front end 182 of the subassembly and a rear end 184 of the subassembly. Even more preferably, the subassembly 180 is attached to the front portion 130 of the frame assembly 22.

Thus, the engine 28 is positioned within a cavity defined between the side panels 160, above the floor 167, forward of a rear wall 170 and below the subassembly 180. Such a construction greatly increases the strength of the forward portion of the frame assembly 22 while the open construction advantageously reduces the amount of material involved and, therefore, decreases the weight. Moreover, through the use of the subassembly 180, the amount of material used in the side panels 160 can be reduced, which lowers the center of gravity, without substantially affecting the integrity of the frame assembly 22.

With reference now to FIG. 10, the illustrated subassembly 180 generally comprises a generally rectangular tubular member 186 that is bent into a U-shape. A bight of the U-shape is disposed forwardly in the illustrated arrangement. A bar 188 extends between the two legs of the U-shaped tubular member 186 at the end opposite the bight. The bar 188 reinforces the open end of the U-shape defined by the tubular member 186. A second bar 190 extends upward and between rear ends 184 of the tubular member 186 to further reinforce the subassembly 180 and to support the body cover 24. Furthermore, a support plate 192 extends upward and rearward from the bar 188 to the second bar 190. The support plate 192 comprises a slotted opening 194 and the plate and the opening are positioned within a region in which a steering shaft portion of the steering mechanism extends. In the illustrated arrangement, the bar 188 is disposed forward of at least a portion of the engine while the other bar 190 is disposed rearward of at least a portion of the engine. In fact, the bar 190 advantageously is disposed rearward of the entire engine in one arrangement to further enhance the structural integrity of the construction.

Figure 12:
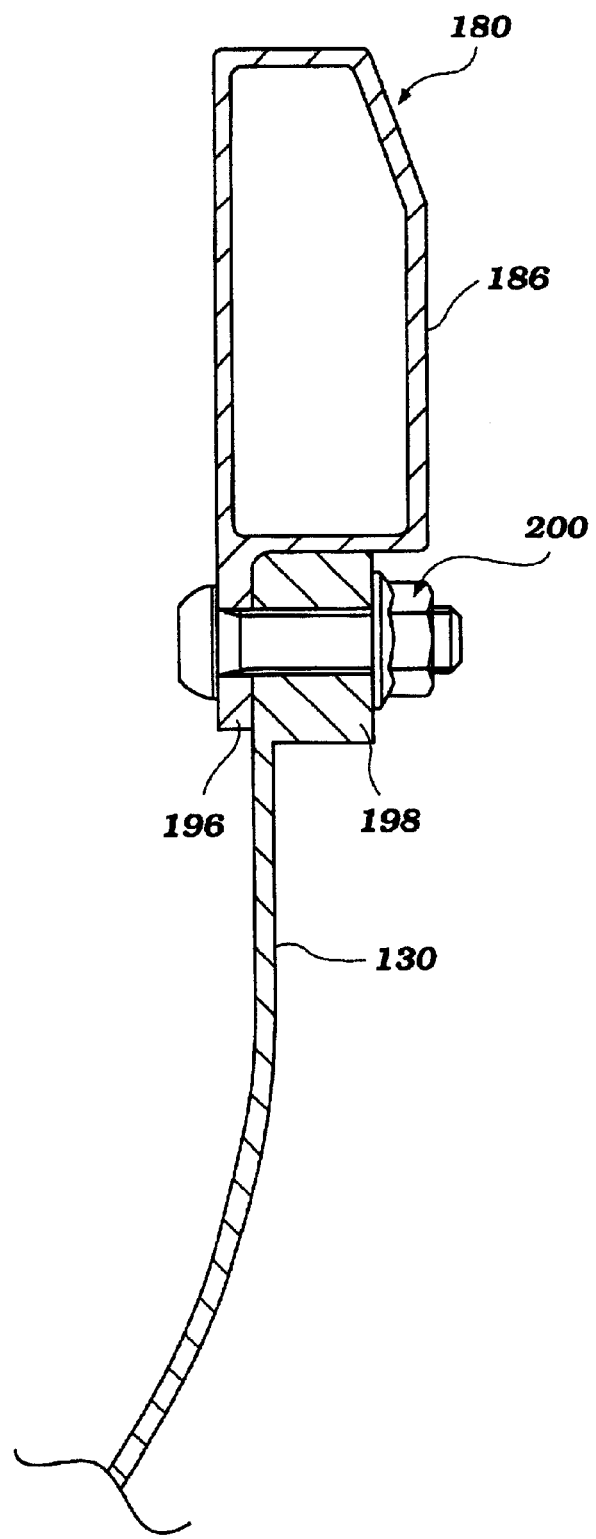
FIG. 12 is a section view of a portion of the frame assembly taken along the line 12—12 in FIG. 10.

With reference now to FIG. 12, a rear portion of the tubular member 186 is secured to a rearward part of the front portion 130 of the frame assembly 22 in at least two locations. In particular, an ear 196 is secured to the tubular member 186 and a boss 198 is formed on the front portion 130 of the frame assembly 22. A nut and bolt assembly 200 secures the ear 196 and the boss 198 together in the illustrated arrangement; however, any suitable arrangement can be used to secure the two components together.

Figure 13:
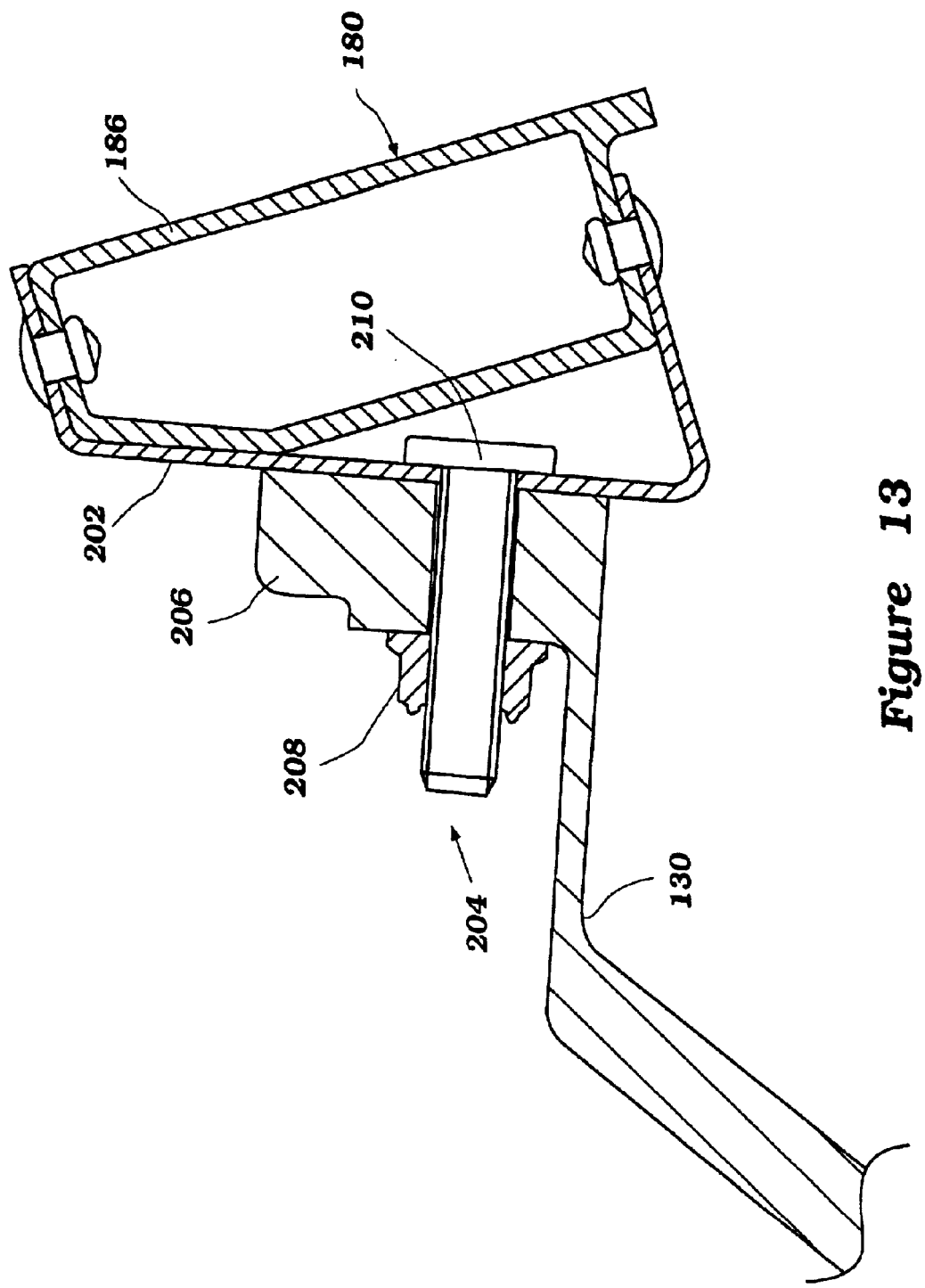
FIG. 13 is a section view of another portion of the frame assembly taken along the line 13—13 in FIG. 10.

With reference now to FIG. 13, a forward portion of the tubular member 186 is secured to a forward part of the front portion 130 of the frame assembly 22. In the illustrated arrangement, a cover plate 202 is secured to the tubular member 186 with rivets. In some constructions, the cover plate 202 can be secured to the tubular member 186 in other manners and, in yet other constructions, the cover plate 202 can be omitted. A fastening arrangement 204 extends through the cover plate 202 and a boss 206 formed along a length of the front portion 130 of the frame assembly 22. In the illustrated arrangement, the fastening arrangement 204 comprises a nut 208 and a bolt 210 but other suitable fastening arrangements can be used.

Desirably, the subassembly 180 is removably attached to the front portion 130 of the frame assembly 22 to enable the subassembly 180 to be removed for access to the engine 28 during maintenance. In some arrangements, the subassembly is mounted in a manner that allows access to the mounting fasteners with the body cover 24 attached to the snowmobile and the subassembly is secured to the body cover 24 such that the subassembly and the body cover can be removed together once the subassembly is separated from the balance of the frame assembly.

In addition, the illustrated construction results in the subassembly 130 generally defining a transverse plane that slopes upward from front to rear. At its rear, the two bars 188, 190 extend at locations on either side of an attachment location to the frame assembly 22.

It should be noted that the air box 92 is mounted to the subassembly 130 in the illustrated arrangement. In one arrangement, the air box 92 is positioned above the subassembly 130 and takes advantage of space available between the subassembly 130 and the body cover 24. In some arrangements, the air box 92 is removably secured to the subassembly 130 with suitable fasteners but other mounting arrangements also can be used. Moreover, the air box 92 comprises the air inlet 93, which is disposed within a region defined by the subassembly 130 and forward of the engine in the illustrated arrangement. Such a location advantageously shields the inlet 93 and protects that portion of the air box 92.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A frame assembly for a snowmobile, the frame assembly comprising:
a front frame portion and a rear frame portion with said front frame portion and said rear frame portion being connected;
said front frame portion comprising a first side member, a second side member and a floor;
an engine compartment generally defined by said first side member, said second side member and said floor;
an engine disposed within said engine compartment;
a frame member comprising a laterally extending member, a first generally longitudinally extending member, and a second generally longitudinally extending member, said frame member defining a generally inclined transverse plane extending upward from front to rear;
wherein said frame member further defines said engine compartment and an upper portion of said engine extends to an elevation above a lower portion of the frame between the first generally longitudinally extending member and the second generally longitudinally extending member, the lower portion of the frame member and the upper portion of the engine being in about the same transverse plane.

2. The assembly of claim 1, wherein said frame member is removably attached to said front frame portion.

3. The assembly of claim 1, wherein said frame member comprises a U-shaped tubular member with a bight formed at a forward end.

4. The assembly of claim 3, wherein said frame member comprises a first transversely extending bar extending between a first end and a second end of said U-shaped tubular member at an open end of said tubular member.

5. The assembly of claim 4, wherein said frame member further comprises a second transversely extending bar extending between said first end and said second end of said U-shaped tubular member at a location toward said bight relative to said first bar.

6. The assembly of claim 5, wherein said frame member further comprises a support member extending between said first bar and said second bar.

7. The assembly of claim 4, wherein said first bar is disposed rearward of said engine.

8. The assembly of claim 3, wherein an air box is disposed atop a portion U-shaped tubular member.

9. The assembly of claim 3, wherein an air box is disposed above a portion of said U-shaped tubular member.

10. The assembly of claim 9, wherein said air box is disposed above said bight of said U-shaped tubular member.

11. The assembly of claim 9, wherein an intake opening into said air box is disposed within a region defined by said U-shaped tubular member.

12. The assembly of claim 11, wherein said intake opening is disposed forward of said engine.

13. The frame assembly of claim 1, wherein said frame member is attached to said front frame portion at a first location at least partially forward of said engine and at a second location at least partially rearward of said engine.

14. The assembly of claim 13, wherein said first location and said second location are disposed on said front frame portion.

15. The assembly of claim 1, wherein said frame member further comprises a pair of transversely extending members that are disposed on a rearward portion of said frame member and a location at which said frame member is connected to said frame assembly is interposed between said pair of members.

16. The assembly of claim 15, wherein a central portion of each of said pair of members is vertically offset from each other.

17. The assembly of claim 1, wherein said frame member is removable from said frame assembly.

18. The assembly of claim 1, wherein said frame member primarily comprises an extruded component that is bent into a U-shape.

19. The frame assembly of claim 1, wherein said upper portion of said engine extends to an elevation above an upper portion of the frame member.

* * * * *